(12) United States Patent
Belser

(10) Patent No.: US 6,643,082 B1
(45) Date of Patent: Nov. 4, 2003

(54) SERVO SECTOR FORMAT FOR A PATTERNED MEDIA

(75) Inventor: Karl A. Belser, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 490 days.

(21) Appl. No.: 09/591,546

(22) Filed: Jun. 8, 2000

Related U.S. Application Data

(60) Provisional application No. 60/138,258, filed on Jun. 8, 1999, provisional application No. 60/138,255, filed on Jun. 8, 1999, provisional application No. 60/138,257, filed on Jun. 8, 1999, provisional application No. 60/138,256, filed on Jun. 8, 1999, provisional application No. 60/143,482, filed on Jul. 12, 1999, provisional application No. 60/150,122, filed on Aug. 20, 1999, and provisional application No. 60/150,123, filed on Aug. 20, 1999.

(51) Int. Cl.[7] .............................. G11B 5/09; G11B 5/596
(52) U.S. Cl. ........................ 360/48; 360/51; 360/77.08
(58) Field of Search ........................ 360/48, 51, 77.08, 360/78.04

(56) References Cited

U.S. PATENT DOCUMENTS

| | | | | |
|---|---|---|---|---|
| 5,473,480 A | * | 12/1995 | Ishida | ........................ 360/51 |
| 5,903,410 A | * | 5/1999 | Blaum et al. | ............. 360/77.08 |
| 6,154,330 A | * | 11/2000 | Nakagawa | ................... 360/48 |
| 6,337,779 B1 | * | 1/2002 | Shirane | ....................... 360/69 |
| 6,487,032 B1 | * | 11/2002 | Cloke et al. | .................. 360/51 |

* cited by examiner

Primary Examiner—Regina N. Holder
(74) Attorney, Agent, or Firm—Raghunath S. Mimisandram; Jesus Del Castillo

(57) ABSTRACT

A servo sector format for a patterned media, such as a magnetic media, includes a first patterned servo timing mark, a patterned gray code, a plurality of PES burst separators, and a second patterned servo timing mark. The first patterned servo timing mark indicates the start of a servo sector. The plurality of PES burst separators are areas where no data can be written. A plurality of servo burst fields are written magnetically between the plurality of PES burst separators, and are used to determine at least one position error signal. The servo sector format further includes magnetically written gray code positioned after the second servo timing mark. The patterned gray code is used in addressing the tracks located on the surface of a disk when the magnetically written gray code is self-written.

27 Claims, 11 Drawing Sheets

SERVO SECTOR FORMAT FOR A PATTERNED MEDIA

CROSS-REFERENCE TO RELATED APPLICATIONS

This application claims the benefit of United States Provisional Application No. 60/138,258 filed Jun. 8, 1999, United States Provisional Application No. 60/138,255 filed on Jun. 8, 1999, United States Provisional Application No. 60/138,257 filed on Jun. 8, 1999, United States Provisional Application No. 60/138,256 filed on Jun. 8, 1999, United States Provisional Application No. 60/143,482 filed on Jul. 12, 1999, United States Provisional Application No. 60/150,122 filed on Aug. 20, 1999, and United States Provisional Application No. 60/150,123 filed on Aug. 20, 1999.

This application is related to U.S. patent application Ser. No. 09/591,180, entitled "Patterned Media Process," filed on Jun. 8, 2000. The subject matter of this related application is incorporated herein by reference. All related applications are commonly assigned.

BACKGROUND OF THE INVENTION

1. Field of the Invention

This invention relates to magnetic recording media, such as the media used with hard disk drives, and in particular to servo sectors on the magnetic recording media. Still more particularly, the present invention relates to a servo sector format for a patterned media.

2. Description of the Prior Art

Designers, manufacturers, and users of computing systems require reliable and efficient digital information storage and retrieval equipment. Conventional magnetic disk drive storage systems are typically used and are well known in the art. As the amount of information that is stored digitally increases, however, users of magnetic recording media need to be able to store larger and larger amounts of data. To meet this demand, designers of magnetic recording media are working to increase the storage capacity of a recording disk, which is a function of the number of closely spaced concentric tracks on the surface of the disk. Some of the recording disk surface area, however, must be used for purposes other than data storage.

Some systems use various types of indexing marks and alignment indicia to help keep the head properly aligned on a particular track. The indexing marks and alignment indicia are used for precise position reference and track adjustment of the read/write head. These marks and indicia are often recorded in servo sectors, which are angularly-spaced reserved portions of the recording disk surface that extend out approximately radially from the disk centers. Track addresses and angular synchronization signals that determine the circumferential location of the magnetic head can also be recorded in servo sectors. Normal and quadrature position error signal (PES) bursts are often recorded in servo sectors for generation of position error signals that are used to keep the read/write head aligned. Servo sectors use recording disk surface area that could otherwise be used for data storage. Consequently, servo sector information must be stored as efficiently as possible in order to leave as much space as possible for data storage.

Servo sectors are typically written with a servo track writer (STW). The servo track writer provides a clock head that is inserted into the drive and a radial pusher mechanism to accurately position the disk drive actuator. The disk drive to be servo written is placed on the STW, a clock track is written, the actuator arm is positioned at various radial locations, and the desired servo pattern is written.

Ideally, this servo writing process would produce tracks that form perfect concentric circles about the center of rotation of the disk spindle. The tracks would also be spaced at a desired track pitch across the disk. Track pitch is defined as the distance between the centerlines of the track, and in an ideal recording disk the track pitch is equal between each individual track. Unfortunately, factors such as mechanical vibrations that are asynchronous to disk rotation during the servo writing process, along with disk defects and edge/transition noise cause the tracks to form irregular concentric paths and generate deviations in track pitch.

The STW process described above is known in the industry as an open loop STW method because the pusher does not follow the disk flutter and spindle runout. To correct for the errors created during the servo writing process, the disk drive servo is used to estimate the written errors of the servo sectors. Correction factors for each servo sector are then written immediately after each servo sector. The estimation process is one of statistical averaging in which the error is reduced by a factor of F by reading the servo sectors on each track F*F times (F squared). Hence, the amount of time is takes to write a drive is proportional to the cube of the number of tracks N. In other words, if it takes N revolutions to write the tracks, it will take N*N revolutions to correct for the written errors. Consequently, the servo sector information should be recorded on the disk as quickly as possible.

One limitation to conventional servo track writing is the side fringe is fields that emanate from the write heads. When a write head is writing data on a track, the fringe fields can erase data that is stored on tracks adjacent to the one being written. Furthermore, the fringe fields can cause the written magnetic data marks to have curved ends. Magnetic data marks are best written with straight, radial edges because it makes it easier for the head to read the data marks. Thus, it is undesirable to have curved ends on the data marks.

Another limitation to conventional servo systems is the fact that they require high sampling rates due to the high track density seen in contemporary recording disks. But some hard disk drives, such as desktop drives, spin at speeds having low revolutions per minute (RPM). As a result, the low RPM disk drives need more servo sectors per revolution than high RPM disks in order to ensure the servo system in the low RPM drive obtains an adequate sampling rate. Unfortunately, having more servo sectors greatly reduces the format efficiency of a disk. In other words, there is less space for data storage in the low RPM drives.

Given the time consuming and potentially inaccurate process for conventional STW, fabricating the servo sector using a printing process such as the process used in the fabrication of CDs and DVDs is sometimes used. This process is called imprint lithography. It consists of a precision stamper that is mastered on a precision optical or electron beam rotary positioning system. The printed pattern defines both the circumferential and radial edges of the sector servo bits. However, the format pattern used in the imprint lithography process is limited by the size of the optical or electron beam generated by the patterning tool. The beam size limitation may make it impossible to make the servo bits as short as they should be for minimizing the size of the servo sector for a given track density. This means that patterning the servo bits may result in a poor servo format efficiency.

Still another limitation of contemporary servo patterned media is that the edges of the bits have to be aligned at an accurate angle with respect to the play back head in the drive and that the distance between leading and trailing edges have to be precisely controlled. This additional accuracy makes the mastering of the patterned media disk difficult and may make the manufacturing yield low.

Other limitations that result from the use of patterned media are that the surface topography of the media may affect the flying of the recording head over the disk surface and may require a thicker protective overcoat to prevent corrosion of the recording films. It is therefore desirable to make the spatial frequency low and to make the size of the patterns as small as possible.

What is needed is a way to pattern a magnetic recording media that results in a compact servo sector having a high servo format efficiency.

SUMMARY OF THE INVENTION

In accordance with the present invention, a servo sector format for a patterned media is disclosed. The servo sector format is comprised of a first patterned servo timing mark, a short patterned gray code patterned adjacent to the first servo timing mark, a plurality of PES burst separators patterned adjacent to the gray code, and a second patterned timing mark patterned adjacent to the plurality of separators.

After the disk is patterned, a plurality of PES burst islands defined by the PES burst separators are DC magnetized at the inner diameter (ID). In the preferred embodiment, the adjacent corners of the first two PES islands form a single normal ($N_{INIT}$) null pattern bit when DC magnetized. The third and fourth islands form a single quadrature ($Q_{INIT}$) null pattern bit when DC magnetized. The $N_{INIT}$ and $Q_{INIT}$ null pattern bits are used to start a self-initialization process in which tones are written on all of the PES islands and in which all other areas of the disk are DC erased.

The resulting plurality of servo burst fields preferably form a quad. pattern comprised of an A burst, a B burst, a C burst and a D burst. After the initial servo burst field patterns are written, a recording head whose writer is offset radially to the outer diameter (OD) from the reader is used to perform the self-initialization process. The reader tracks on the previously written servo burst fields and the writer writes tones on the A, B, C and D PES islands to the outer diameter of the previous written tones. The normalized A-B amplitude signal is then used to generate the normal $PES_{13}N$ for the disk drive. The normalized C-D amplitude signal is used to generate the quadrature $PES_{13}Q$ for the disk drive.

The preferred embodiment further comprises magnetically written gray code written adjacent to the second patterned servo timing mark. The magnetically written gray code is preferably written circularly around the rotational center of the disk because the disks will typically be mounted in the disk drive such that the servo pattern is eccentric to the rotational center. The magnetically written gray code can be written at a higher spatial frequency than that of the patterned gray code and thus is more area efficient. The magnetically written gray code is used to define the track number of the data tracks with no eccentricity.

In the preferred embodiment, each magnetically written gray code bit is written by pulsing the recording head on the previously erased media. Two marks are written to encode each gray code bit. The marks are written on every other two-thirds of a track such that the effects of the head width variations and the fringe fields are eliminated. The magnetically written gray code bit is detected as the logical OR of the sensed signal in the two bit locations.

The first patterned servo timing mark indicates the start of a servo sector, and is preferably used when reading the patterned gray code and decoding the servo bursts. The patterned gray code is used in addressing the tracks when the magnetic gray code is self-written. The preferred gray code groups the tracks into groups of tracks that are a power of two in number so binary addressing can be used for the magnetic gray code. The plurality of separators are areas where no data can be written, which has the effect of masking the fringe fields of the writer. Finally, the second patterned servo timing mark acts as a check on the occurrence of the first servo timing marks, and is an accurate timing reference for the magnetic gray code transitions.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 9b is a diagram depicting a portion of a media patterned according to the method illustrated in FIGS. 8 and 9a;

DESCRIPTION OF THE PREFERRED EMBODIMENT

The present invention relates to a servo sector format for a patterned media. The following description is presented to enable one of ordinary skill in the art to make and use the invention and is provided in the context of specific embodiments. However, various modifications to the specific embodiments will be readily apparent to those skilled in the art and the generic principles herein may be applied to other embodiments. Thus, the present invention is not intended to be limited to the embodiment shown but is to be accorded the widest scope consistent with the appended claims and with the principles and features described herein.

Figure 1:
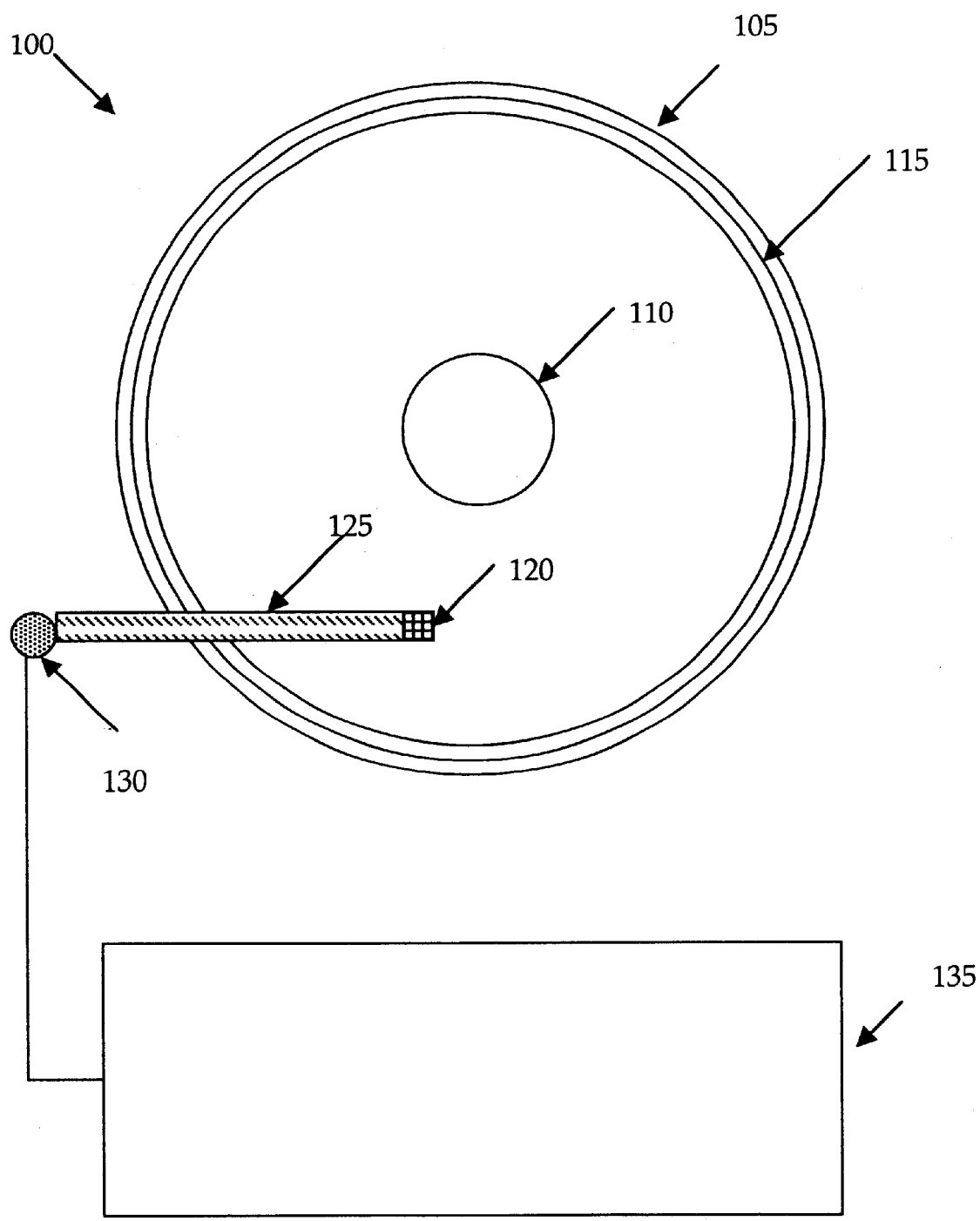
FIG. 1 is a diagram of a conventional hard disk drive assembly.

With reference now to the figures and in particular with reference to FIG. 1, a diagram of a conventional hard disk drive assembly is shown. The disk drive assembly 100 includes one or more recording disks 105, which are rotated at high speeds by a spindle motor 110. A plurality of concentric tracks 115 are recorded on the surface of the disk 105 and are used to store data. For clarity, only two tracks are shown in FIG. 1. The tracks are displaced radially from each other, beginning at the inner diameter of a disk and continuing to the outer diameter.

A head 120 is used to read data from and write data to specific locations on the disk 105. The head 120 is an air-bearing head, meaning it moves, or "flies", at a very close distance from the surface of the disk 105. In conventional disk drive systems, the head 120 flies at approximately five to ten nanometers in height from the surface of a disk 105. The head 120 is attached to an arm 125, which in combination with an actuator 130 moves the head 120 from one track to another on the disk. Storage system controller 135 controls the placement of the head 120 to a specific logical location via a particular track address and a particular sector address.

Figure 2:
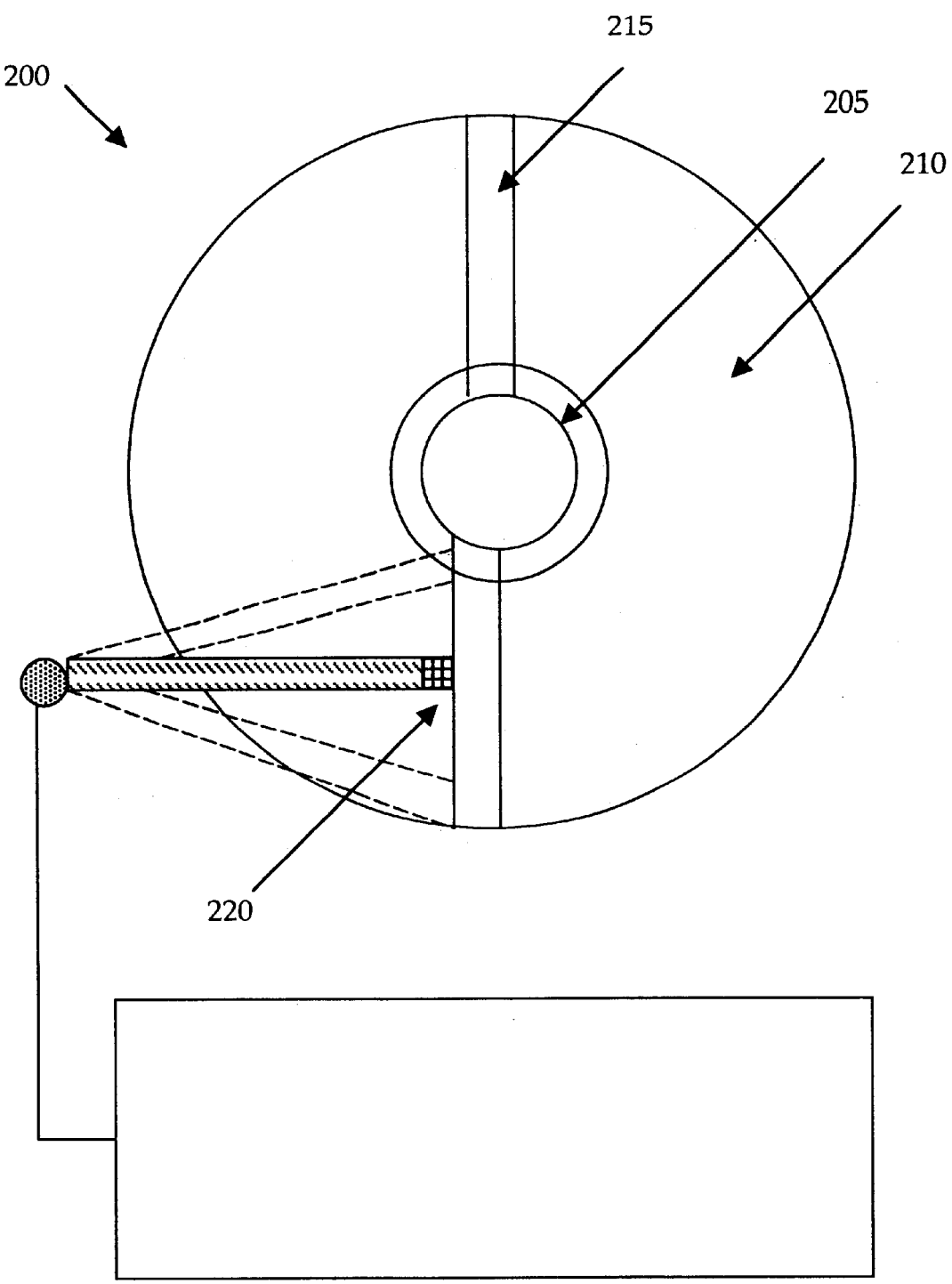
FIG. 2 is a diagram depicting an upper surface of a recording disk according to the present invention.

FIG. 2 is a diagram depicting an upper surface of a recording disk used in the disk drive. assembly of FIG. 1. The upper surface of a recording disk 105 preferably includes a landing zone 205, a useable data zone 210, arc-shaped sectors 215, and an arc-shaped path 220 taken across the recording disk 200 surface by read/write head 120. As discussed earlier, arm 125 turns around the actuator axis 130 to position the read/write head 120 relative to the center of the spindle 110.

Figure 3:
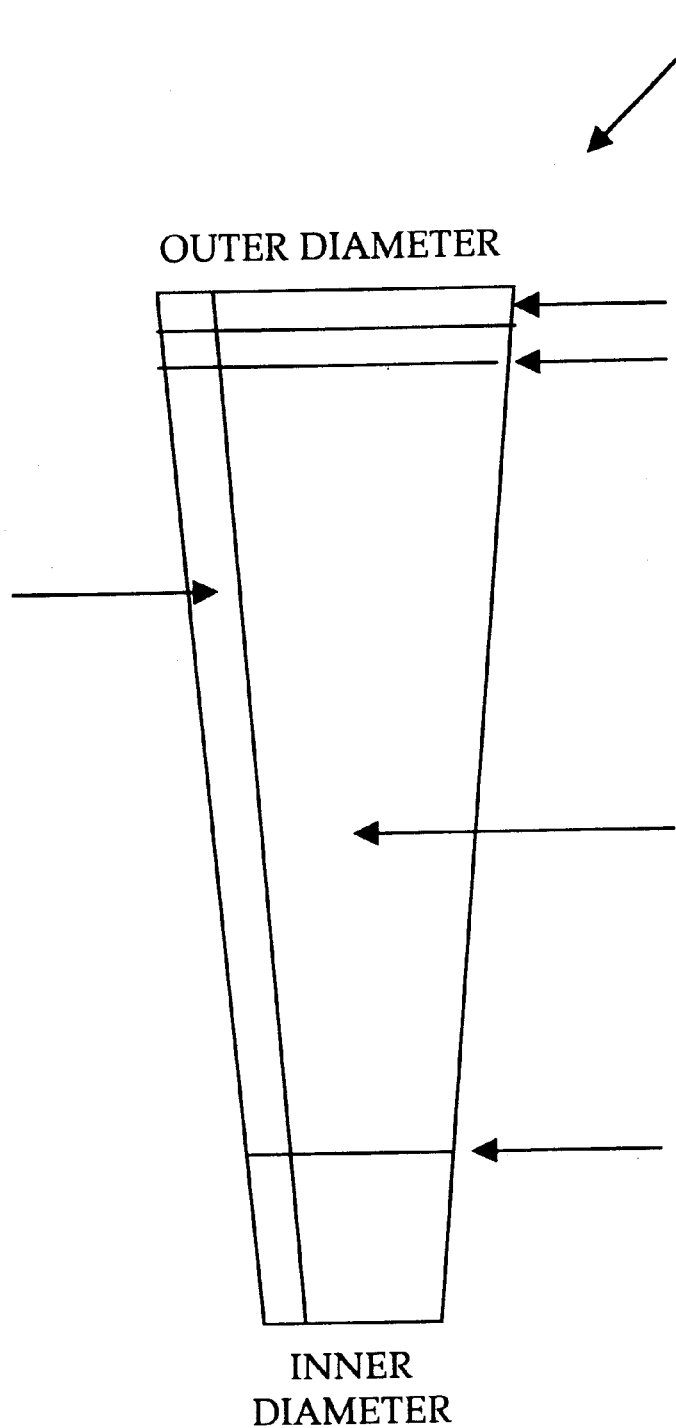
FIG. 3 is a linearized diagram of one embodiment of a sector of the recording disk illustrated in FIG. 2.

Referring now to FIG. 3, a linearized diagram of one embodiment of a sector illustrated in FIG. 2 is shown. Recording disk 105 includes an exemplary sector 300, a servo sector 305, a data wedge 310, a pair of neighboring numbered concentric tracks 315 and 320, and a border 325 between landing zone 205 and useable data zone 210. Data wedge 310 preferably includes stored user data, while servo sector 305 includes address and alignment information used by the disk drive system.

During disk fabrication, servo sector data is both patterned on the surface of the disk and written on a disk by a self-servo writing process in the preferred embodiment. Servo sector data is used to ensure one or more heads follow a designated track accurately, and to control and monitor transitions of the head when it moves to "seek" from one track to another track location. The head position information enables a storage system controller to re-align the head over a track when position errors are detected.

Figure 4:
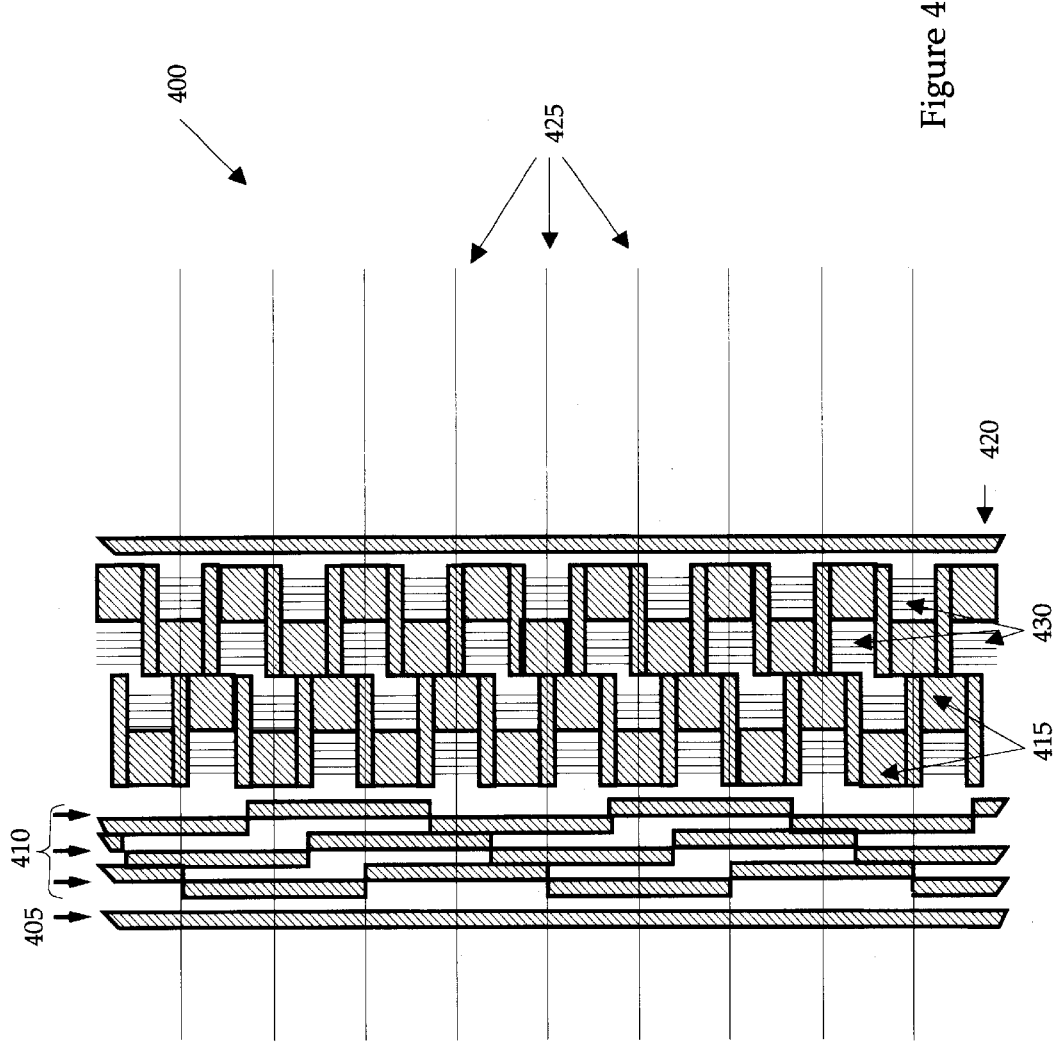
FIG. 4 is a diagram illustrating a servo sector format for a patterned media according to the present invention.

In the preferred embodiment, servo sector 305 is comprised of patterned guide zones, magnetically written servo burst fields, and magnetically written gray code. FIG. 4 is a diagram illustrating a servo sector format for a patterned media according to the present invention. The servo sector format 400 is comprised of a first patterned servo timing mark 405, a short patterned gray code 410, a plurality of PES burst separators 415, and a second patterned servo timing mark 420. The patterned servo sector format 400 is shown with rectangular patterns, but the present invention is not limited to this shape. The servo sector format 400 can be formed using other types of shapes. However, in the preferred embodiment, the patterned gray code 410 is patterned with diagonally adjacent corners. This process is described in more detail with reference to FIGS. 8–9. To assist i n understanding the invention, the horizontal lines 425 shown in FIG. 4 depict the center of the tracks.

The servo sector format pattern 400 is used to pattern the surface of a magnetic recording disk. In other words, servo sector format pattern 400 is used to create a combination of raised features and depressed features in or on the surface of the recording disk. A depressed feature is known as a pit, and the first patterned servo timing mark 405, the patterned gray code 410, the plurality of PES burst separators, and the second patterned servo timing mark 420 are comprised of a pattern of pits.

After the disk is patterned, a plurality of servo burst fields 430 are written magnetically between the plurality of PES burst separators 415. The radial edges of the plurality of PES burst separators 415 mask the fringe fields from the head, thereby eliminating any side erasure problems. The plurality of servo burst fields 430 are preferably written as a quad pattern comprised of an A burst, a B burst, a C burst and a D burst. The present invention is not limited to a quad pattern, however. Other servo burst field patterns, such as a tri-faced patterned, can be used with the present invention.

The servo burst fields 430 are used to generate position error signals (PES). In the preferred embodiment, the position error signal is determined by the equation $PES_{13}N=A-B/C-D$. If the result of that equation is less than one, then the $PES_{13}N$ signal is used. If the result is greater than or equal to one, the position error signal is determined by the equation $PES_{13}Q=C-D/A-B$. It is important to note that the switch between $PES_{13}N$ and $PES_{13}Q$ occurs when the value is one. However, calculating a position error signal is well known in the art, and other calculations for the positioning error signals can be used with the present invention.

In the preferred embodiment, the servo pattern is a 3/2 pattern with a burst field width of approximately two-thirds of a track pitch. This means there are three cycles of the PES pattern for every two tracks. This pattern is used because the width of a read/write head can vary anywhere from sixty-six percent (66%) of the track pitch up to one hundred percent (100%) of the track pitch. And it is important to write the servo burst fields 430 in one pass of the head, so that the side erasure effects of the head are avoided. If the fringe fields from the recording head erase some of the servo burst fields 430, undesirable radial gaps in the servo burst fields 430 would be created. As a result, only two-thirds of a track, the minimum recording head width, can be written with certainty.

An alternative to writing a servo burst field on two-thirds of a track is to use focused ion-beam trimming. With focused ion-beam trimming, a head having a width wider than a track is created and then is trimmed to be exactly one track wide. The head is now able to write bursts that are exactly one track wide. Focused ion-beam trimming, however, is generally more costly and as a result is less desirable when manufacturing low cost disk drives.

Referring again to FIG. 4, the first patterned servo timing mark 405 indicates the start of a servo sector, and is preferably used when reading gray code 410 and decoding the servo bursts 430. In the preferred embodiment, a long unrecorded region precedes the first patterned servo timing mark 405. The length of the unrecorded region is long enough to constitute a data recording violation. This is done so that the first patterned servo timing mark 405 is not mistaken for data when a disk drive is attempting to find the servo sectors after an initial power up of the drive.

Patterned gray code 410 is used in addressing the tracks when the magnetically written gray code is written. In the preferred embodiment, the patterned gray code 410 is comprised of three bits formulated into a modulo 6 gray code, known as a Johnson code or a Johnson counter code. The modulo 6 gray code is preferably used to groups the tracks into groups of four so binary addressing of the tracks can be used. However, the present invention is not limited to grouping the tracks into groups of four. Groups that are a power of two in number can be used with the present invention.

Patterned gray code 410 is also used to compensate the read to write offset. With the 3/2 pattern, the even numbered track centers 425 correspond to servo bursts A and B, while the odd numbered track centers 425 are associated with servo bursts C and D. Additionally, the patterned gray code 410 changes every PES servo burst field 430. This is due to the fact that there are six PES bursts every four tracks. This enables the position of the head to be determined accurately when writing the magnetic transitions.

Figure 5:
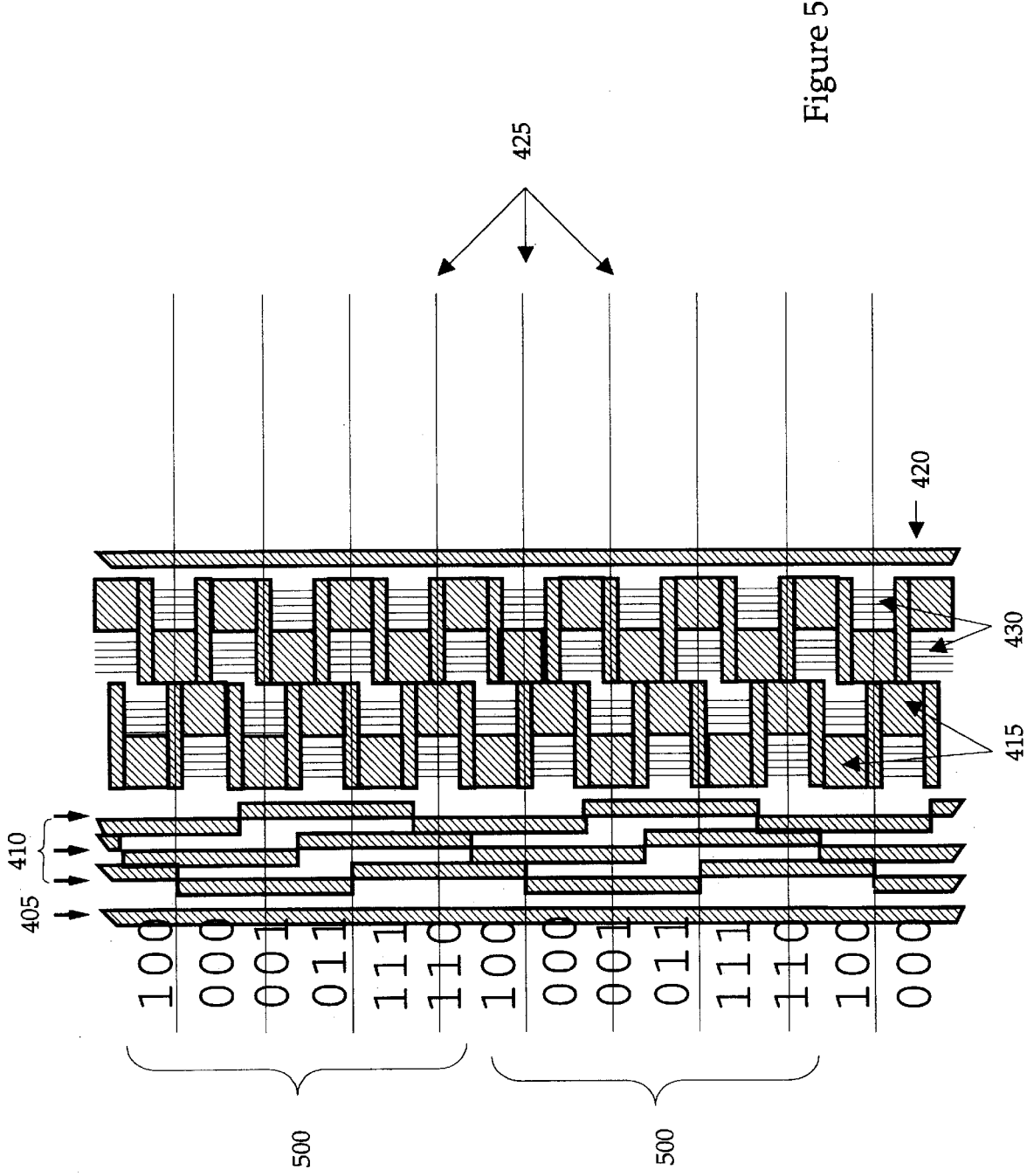
FIG. 5 is a diagram depicting an exemplary addressing scheme for a servo sector format for a patterned media according to the present invention.

FIG. 5 is a diagram depicting an exemplary addressing scheme for a servo sector format 400 for a patterned media according to the present invention. The numbers 500 to the left of servo timing mark 405 illustrate the binary addressing scheme created by gray code 410 in the preferred embodiment. As can be seen, the addresses repeat each six successive servo field bursts 430. And six successive servo field bursts 430 correspond to four tracks. Thus, the recording head does not get lost when writing the circular tracks because determining the position of a read/write head is made easier by the gray code 410.

Figure 6:
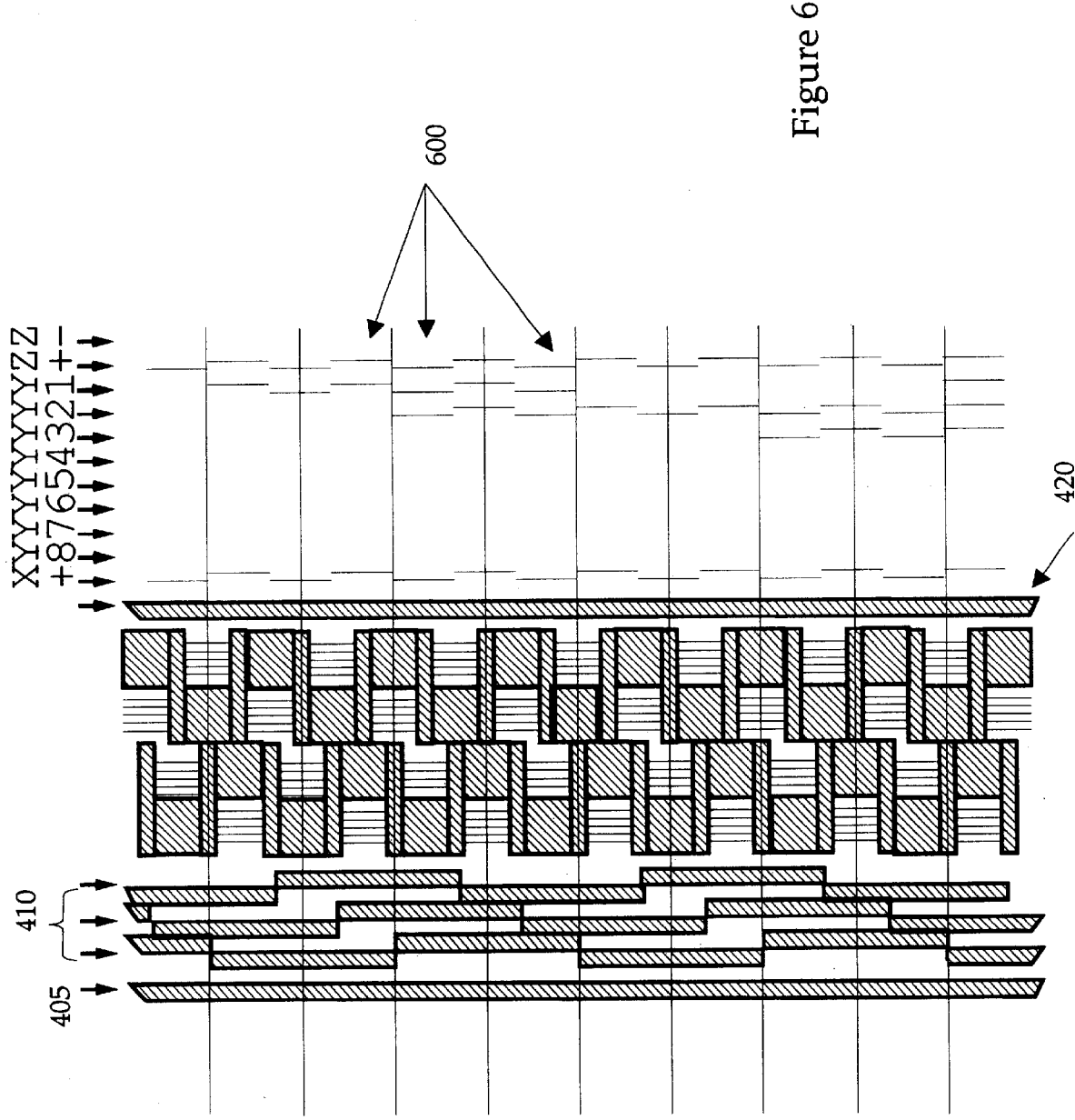
FIG. 6 is a diagram illustrating a servo sector format for a patterned media and an exemplary magnetically written gray code according to the present invention.

Referring to FIG. 6, a diagram illustrating a servo sector format for a patterned media and an exemplary magnetically written gray code according to the present invention is shown. Second patterned servo timing mark 420 is used to signal the start of the magnetically written gray code 600.

The magnetically written gray code 600 is preferably written circularly around the rotational center of the disk because the disks will typically be mounted in the disk drive such that the servo pattern is eccentric to the rotational center. The magnetically written gray code 600 can be written at a higher spatial frequency than that of the patterned gray code and thus is more area efficient. The magnetically written gray code 600 is used to define the track number of the data tracks with no eccentricity.

In the preferred embodiment, each magnetically written gray code bit is written by pulsing the recording head on the previously erased media. Two marks are written to encode each gray code bit. The marks are written on every other two-thirds of a track such that the effects of the head width variations and the fringe fields are eliminated. The magnetically written gray code bit is detected as the logical OR of the sensed signal in the two bit locations. FIG. 6 illustrates the magnetically written gray code 600 written on two-thirds (or sixty-six percent) of the track pitch. However, the present invention is not limited to this embodiment. The magnetically written gray code 600 can be written at widths that vary in length from sixty-six percent of a track pitch up to one hundred percent of the track pitch.

Another aspect of the invention is that some of the bits in the magnetically written gray code 600 can be encoded serially and some can be encoded in parallel. This technique minimizes the space needed for the magnetically written gray code 600 and improves the format efficiency.

The servo burst fields 430 and the magnetically written gray code 600 are written by the drive using a self-servo writing process. The self-servo writing process uses an offset head arrangement, which means that the writer head is always positioned to the outer diameter from the reader by at least one track pitch. In the preferred embodiment, the servo patterns on the disk are circular but are mounted eccentric to the rotation center of the disk, and the final data tracks will be circular about the rotational center.

Figure 7:
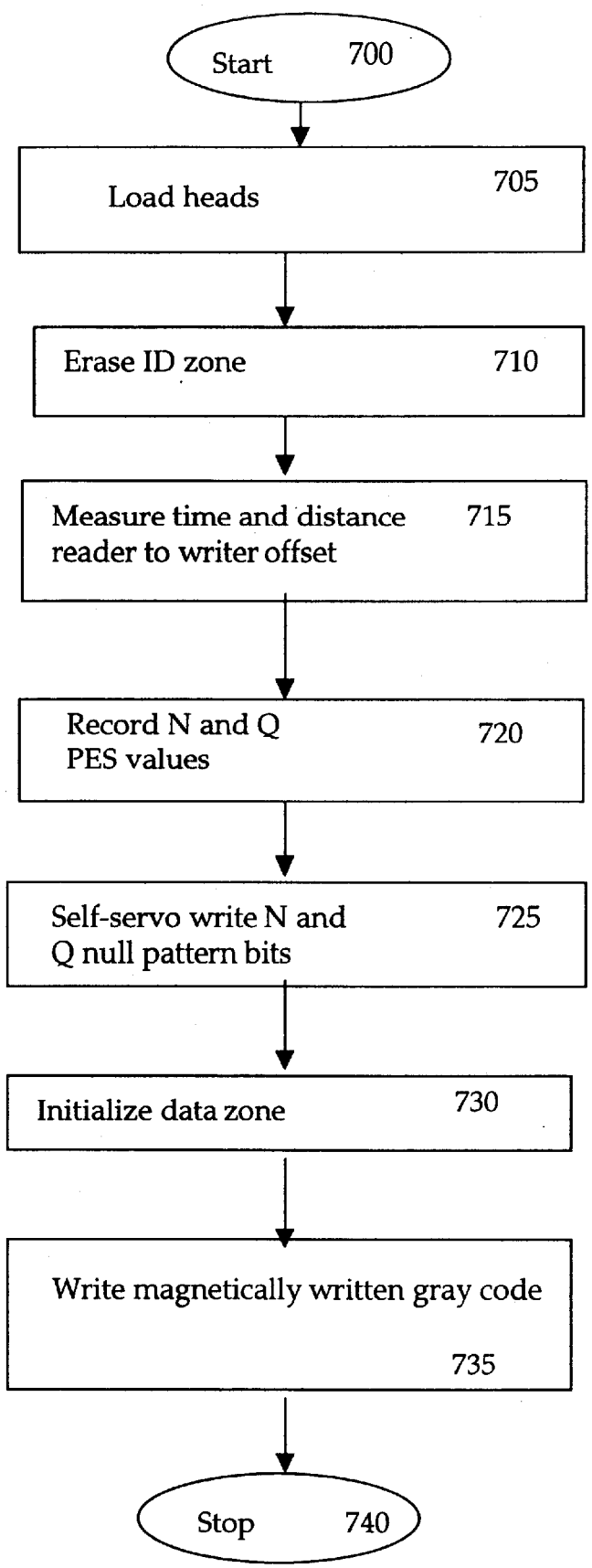
FIG. 7 is a flowchart illustrating the steps of an exemplary initialization procedure for the servo sector format of FIG. 4.

FIG. 7 is a flowchart illustrating the steps of an exemplary initialization procedure for the servo sector format of FIG. 4. Those skilled in the art will appreciate that other initialization procedures can be used with the servo sector format of the present invention. The initialization procedure occurs when a magnetic recording disk is assembled into a disk drive without any previous magnetization.

In the exemplary embodiment, the drive has time interval measurement capability in order to determine the time difference between writing data on the disk and reading data from the disk. This is necessary since the recording head preferably has an offset head arrangement, where the writer is always positioned outside (to the outer diameter) of the reader by at least one track pitch independent of radius. The time interval to be measured is selected by a window having a specified time duration and delayed by a specified delay from the preceding servo timing mark. This time difference comprises the electronics delay and the physical separation delay between the reader head and the writer head. The separation delay is the reader to writer separation distance divided by velocity.

The drive also has a time delay trimming circuit with a resolution of less than one nanosecond in the exemplary embodiment. The write current can then be advanced or delayed in sub-divisions of the channel clock period. The time delay trimming circuit allows the clock to be divided into several sub-divisions for more accurate timing control of the PES patterns.

To initialize a disk, the disk should have the patterned servo sector format shown in FIG. 4 at the inner diameter (ID) of the disk to a distance of one millimeter inside the ID crash stop. In the exemplary embodiment, the read and write heads are loaded onto the media when the drive is turned on, as shown in block 705. The read and write heads are loaded onto the disk surface at the outer diameter (OD) and then moved to the inner diameter (ID) to push against the ID crash stop.

Next, current should be applied to the actuator arm motor to compress the crash stop by about one hundred micrometers while applying sufficient DC current to DC magnetize the media and erase the media completely and uniformly (block 710). Once erased, the erase current is turned off and the patterned servo timing marks, $N_{INIT}$ and $Q_{INIT}$ are read. In this exemplary embodiment, the adjacent corners of the first two PES islands form a single normal ($N_{INIT}$) null pattern bit when DC magnetized. The third and fourth islands form a single quadrature ($Q_{INIT}$) null pattern bit when DC magnetized.

Next, the time and distance reader to writer offset is measured, as shown in block 715. With the ID crash stop compressed, a mark of opposite polarity to the erased background is written at a location just after the end of one of the patterned servo sectors, in a data wedge. The exact radial starting position is calculated by reading the $N_{INIT}$ value, $Q_{INIT}$ value, and the patterned gray code value when the mark is written. The actuator arm current is then lowered until a pulse is detected using the time interval measurement circuit.

The start of the window is then adjusted to trigger on the second patterned servo timing mark. The time interval measurement circuit will record an error or a very high value until the magnetic mark is detected. The $N_{INIT}$ value, $Q_{INIT}$ value, and the patterned gray code value are read when the mark is first detected and read again when the mark is last detected (block 720). This allows the radial and circumferential reader-to-writer offsets to be calculated because the center of the head is halfway between the first reading of the mark and the last reading of the mark. Additionally, the number of times the $N_{INIT}$ value and the $Q_{INIT}$ value equals zero are counted, along with a fractional value for $N_{INIT}$ value or the $Q_{INIT}$ value. This information is used to calculate the offsets.

A portion of the servo burst fields are now initialized with magnetic marks (block 725). The previously calculated radial and time offsets and the calculation of zero for either the $N_{INIT}$ or $Q_{INIT}$ values from the previous patterned servo sector are used to determine when to write an A or B burst (N pattern) or a C or D burst (Q pattern). In this exemplary embodiment, a burst is written when the $N_{INIT}$ value or the $Q_{INIT}$ value does not equal zero and the write head is positioned over a location where a burst is to be written. It is important to note that this process can be slow because it is desirable to lower the actuator arm current slowly in order to decompress the crash stop and have every servo burst field in an initial zone at the ID written. The initial zone should be sufficiently wide to accommodate the eccentricity of the disk plus the head offset.

Next, the initialization of the data zone should be finished, as shown in block 730. The actuator arm current is lowered until the regular PES tones can be read and the high bandwidth actuator is used to track-follow the servo sectors. A feed forward signal is then calculated in order to compensate for the eccentricity so that the PES error is very low. In the exemplary embodiment, the radial and circumferential offset is measured every one thousand tracks in order to account for any timing changes and actuator arc skew. The last step is to write the magnetically written gray code. The initialization procedure then ends, as shown in block 740. When data is written circularly on the tracks an offset table is used to account for the eccentricity of the patterned PES. This offset will be the same for the entire track writing process.

Figure 8:
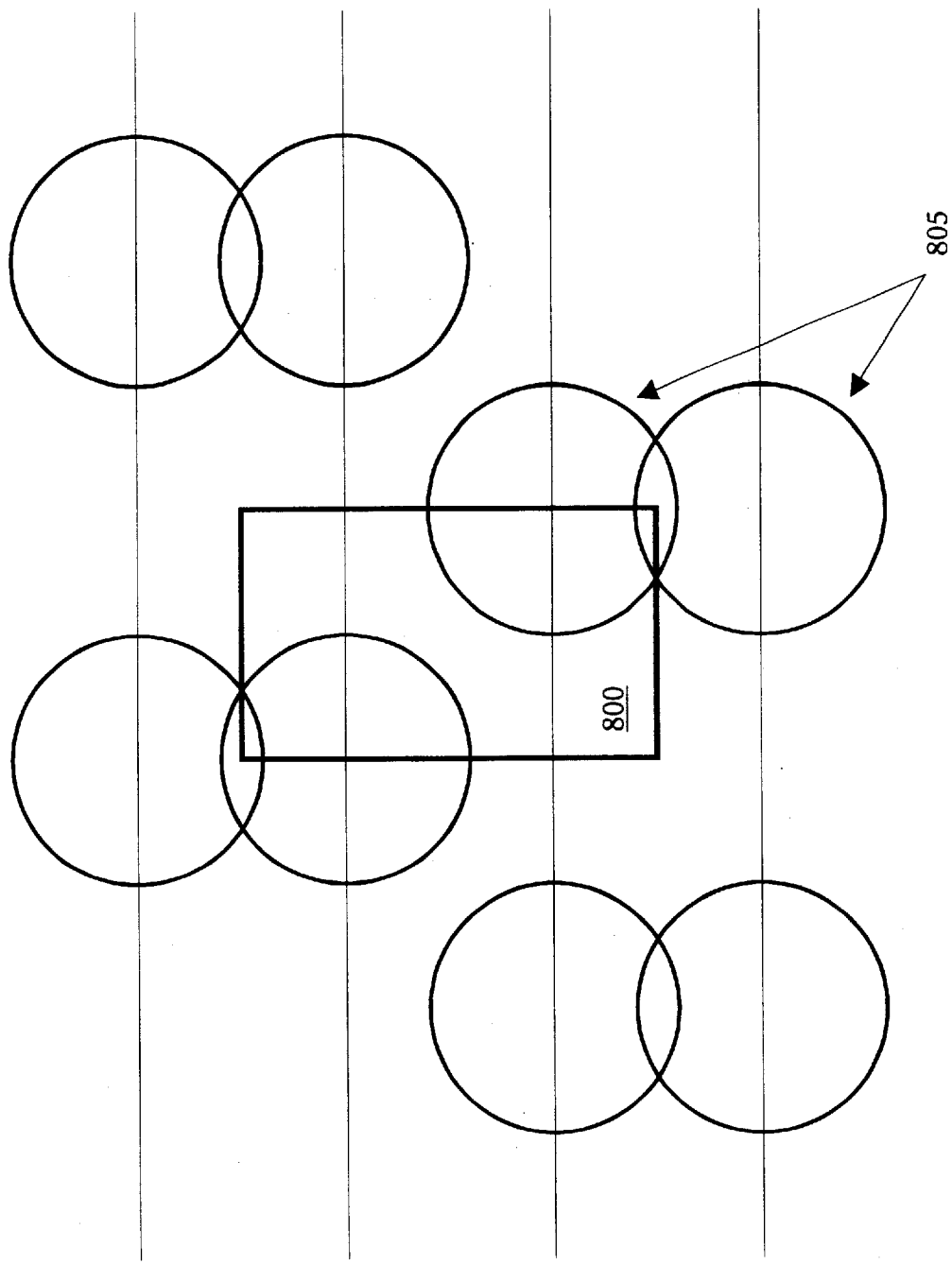
FIG. 8 is a diagram depicting a method for patterning a media according to the present invention.
Figure 9B:
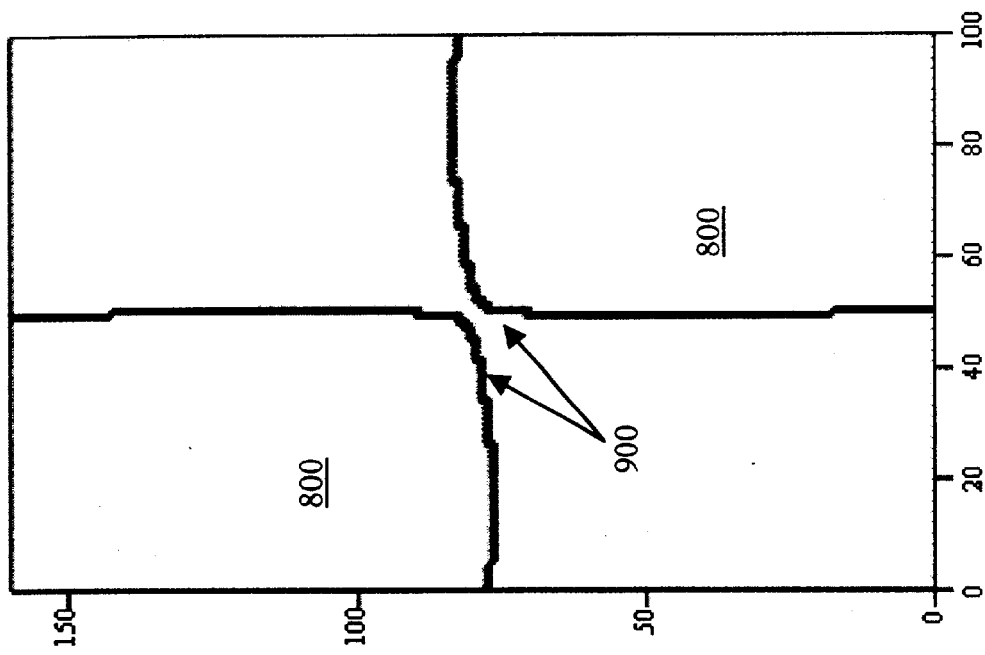
Figure 9A:
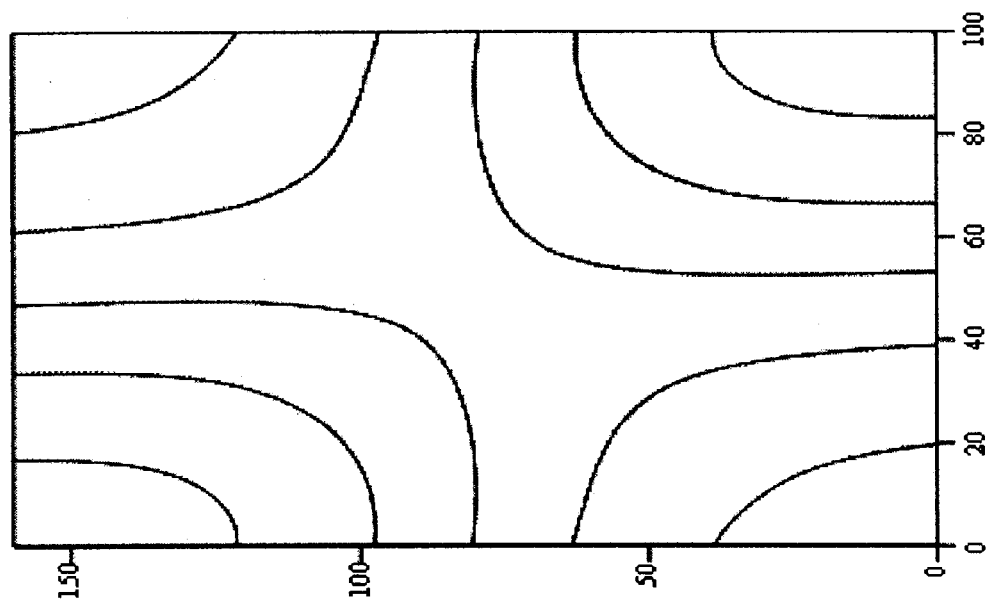
FIG. 9a is a diagram illustrating the dosage contours for patterning a media according to the present invention.

Referring to FIG. 8, a diagram illustrating a method for patterning a media according to the present invention is shown. In the preferred embodiment, a resist is exposed with a plurality of round circles 800, and the resist is then developed. This creates diagonally adjacent corners in the patterned gray code 410, and the corners enhance the resolution to provide maximum signal amplitude because the sharpness of the diagonally adjacent corners are increased by their proximity. The head, which is aligned radially, can read the bits because the edges of the bits are also aligned radially. FIG. 9a depicts the dosage contours of integrated exposure energy used in the patterning process. In this illustration, a unit is equal to a full width half max diameter of the laser beam. Each integer value corresponds to 0.01 units in FIG. 9a. FIG. 9b illustrates the developed mark shapes 800 after the patterned process. Again, each integer value corresponds to 0.01 units. As can be seen in FIG. 9b, diagonally adjacent corners 900 are formed at the ends of the resist pattern.

Figure 10:
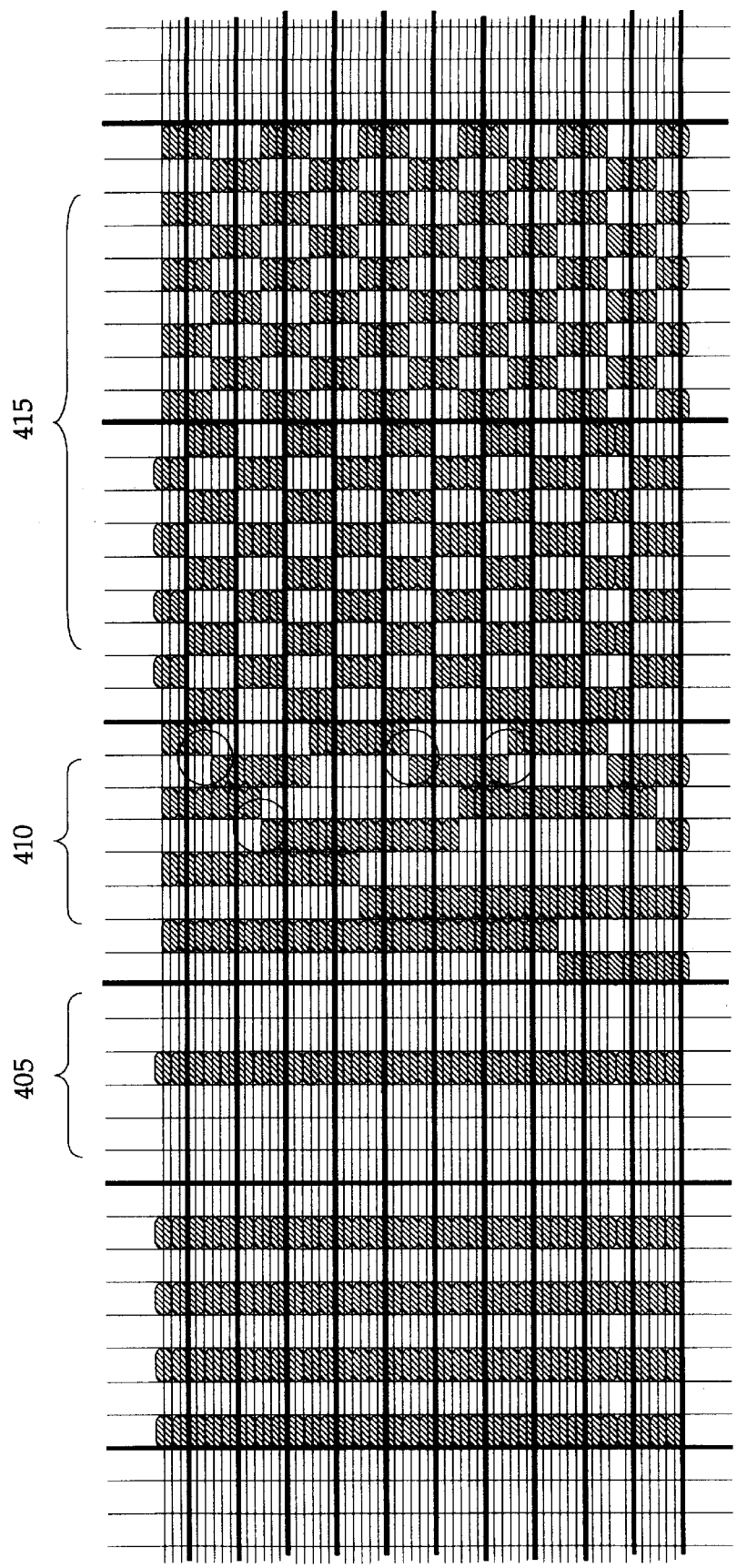
FIG. 10 is a diagram illustrating a conventional bit patterned media for a servo sector.

Referring to FIG. 10, a diagram depicting a conventional bit pattern media for a servo sector is shown. The circled areas in the patterned gray code 410 are areas where the bits have been patterned using the process described with reference to FIGS. 8 and 9. In other words, the gray code 410 has been patterned to have diagonally adjacent corners in the circled areas. For clarity, only a few locations where diagonally adjacent corners are needed are shown. The servo sector format in FIG. 10 is an example of a null pattern bit patterned media where every feature is defined by diagonally corners. As discussed earlier, diagonally adjacent corners are desirable because they provide maximum signal amplitude when reading the patterned gray code 410.

Figure 11A:
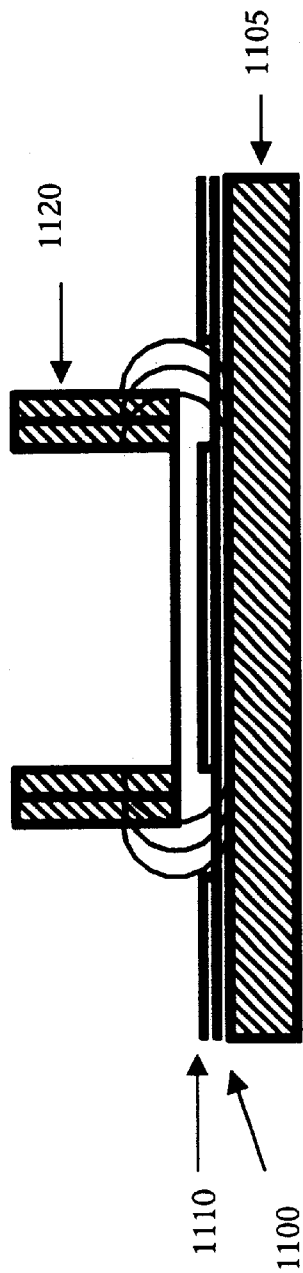
FIG. 11 is a diagram depicting alternative methods for patterning a media.
Figure 11B:
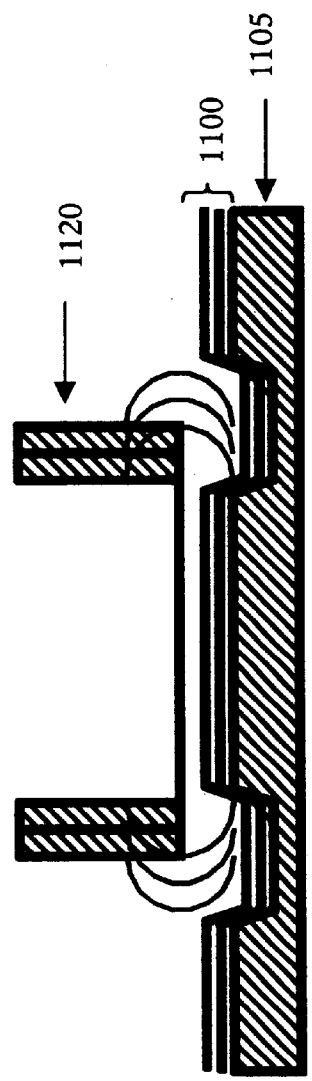

FIGS. 11a–11b are diagrams depicting two alternate methods for patterning a media according to the present invention. The patterning process of FIGS. 11a–11b utilizes a master to make a stamper. The master is created by depositing a photoresist layer over a substrate. The photoresist material is then exposed to a pulsating electron or ion beam, where the pulsing of the beam is determined by the desired format pattern that is to be patterned into a magnetic media. The electron or ion beam has the ability to define very small features, and features as small as one hundred nanometers in size can be achieved with a deep UV machine, while features as small as ten nanometers can be obtained with a electron beam machine.

The stamper is then made from the master, and is a metal layer typically comprised of nickel. Because the photoresist layer is able to reproduce the format pattern accurately, the small format pattern is transferred faithfully to the stamper. In FIG. 11a, one method for patterning magnetic media is shown. A first layer 1100 is deposited over a substrate 1105, followed by a recording layer 1110. Typically, the first layer 1100 is comprised of a chromium (Cr) layer, and the recording layer 1110 is comprised of a cobalt chromium (CoCr) layer. Those skilled in the art will understand however, that other types of materials can be used for the first layer 1100 and the recording layer 1110.

A resist layer is then deposited over the recording layer (not shown). A stamper is then pressed into the resist layer in order to transfer a format pattern from the surface of the stamper into the surface of the resist layer. The stamper compresses some portions of the resist layer, while other portions retain their original thickness. After the stamper is removed, the compressed portions of the resist layer are etched. away, until the underlying recording layer 1110 is exposed. The etching process continues until portions of the recording layer 1110 are removed, thereby creating regions that can not be magnetized. The remaining resist layer is then removed. The servo pattern media is preferably defined by the edges of the recording layer 1110. A read/write head 1120 can then read from or write to the remaining recording layer 1110.

In FIG. 11b an alternative method for patterning a media is illustrated. A resist layer (not shown) is deposited over a substrate 1105, and a stamper is pressed into the, surface of the resist layer in order to transfer the format pattern from the surface of the stamper into the surface of the resist layer (not shown). The stamper compresses some portions of the resist layer, while other portions retain their original thickness. After the stamper is removed, the compressed portions of the resist layer are etched away, until the underlying substrate 1105 is exposed. The etching process continues until a desired etch depth is reached in the substrate 1105. Typically, an etch depth of fifteen to twenty-five nanometers is used.

The remaining resist layer is then removed, and a first layer 1100 and recording layer 1110 are deposited over the substrate. Both the first layer 1100 and the recording layer 1110 conform to the surface of the substrate 1105, thereby creating a patterned magnetic media. The servo sector format for the patterned media is preferably defined by spacing loss.

One of the advantages to the present invention is that improved format efficiencies can be achieved. Secondly, a more compact servo sector is realized. This allows for more useable data storage space to be available on a disk. The servo sector format of the present invention also minimizes the topography differences in the surface of the recording disk, thereby allowing a head to fly over the surface of the disk without being disturbed.

While the invention has been particularly shown and described with reference to a preferred embodiment, it will be understood by those skilled in the art that various changes in form and detail may be made therein without departing from the spirit and scope of the invention.

What is claimed is:

1. A servo sector format for a patterned magnetic media comprising:
    a first patterned servo timing mark;
    a plurality of patterned PES burst separators adjacent to the first patterned servo timing mark, wherein the plurality of patterned PES burst separators are comprised of areas where no data is written;
    a plurality of servo burst fields written magnetically between the patterned separators, wherein the plurality of servo burst fields are used to determine at least one position error signal; and
    a second patterned servo timing mark adjacent to the plurality of patterned PES burst separators.

2. The servo sector format of claim 1, further comprising a patterned gray code between the first patterned servo timing mark and the plurality of patterned PES burst separators, wherein the patterned gray code is used to group a plurality of tracks into groups that are a power of two in number, whereby binary addressing can be used to address the plurality of tracks.

3. The servo sector format of claim 2, wherein the first patterned servo timing mark, the patterned gray code, the plurality of patterned FF5 burst separators, and the second patterned servo timing mark are formed imprint lithography.

4. The servo sector format of claim 2, wherein the patterned gray code is formed by exposing a resist using a plurality of overlapping circular bursts from a laser beam and then developing the resist, whereby the patterned gray code is formed having diagonally adjacent corners.

5. The servo sector format of claim 1, wherein the plurality of servo burst fields are written as a quad pattern comprised of an A burst, a B burst, a C burst and a D burst, and wherein the A burst, B burst, C burst, and D burst are used to determine a first position error signal $PES_{13}N$ and a second position error signal $PES_{13}Q$.

6. The servo sector format of claim 1, wherein the plurality of servo burst fields are written on at least one disk using an offset head arrangement, wherein at least one writer head is offset to the outer diameter of a disk from its corresponding at least one reader head.

7. A servo sector format for a patterned magnetic media comprising:
    a first patterned servo timing mark;
    a plurality of patterned PES burst separators adjacent to the first patterned servo timing mark, wherein the plurality of patterned PES burst separators are comprised of areas where no data is written;
    a plurality of servo burst fields written magnetically between the patterned separators, wherein the plurality of servo burst fields are used to determine at least one position error signal;
    a patterned gray code between the first patterned servo timing mark and the plurality of patterned PES burst separators, wherein the patterned gray code is used to group a plurality of tracks into groups that are a power of two in number, whereby binary addressing can be used to address the plurality of tracks; and
    a second patterned servo timing mark adjacent to the plurality of patterned PES burst separators.

8. The servo sector format of claim 7, further comprising a magnetically written gray code positioned after the second patterned servo timing mark, wherein the magnetically written gray code assists in determining where at least one head is positioned over at least one disk.

9. The servo sector format of claim 8, wherein the magnetically written gray code is written circularly around the rotational center of at least one disk.

10. The servo sector format of claim 9, wherein the magnetically written gray code has a width that ranges from sixty-six percent of a track pitch to one hundred percent of a track pitch.

11. A method for fabricating a servo sector for patterned magnetic media comprising the steps of:
    patterning a first servo timing mark on the surface of the media;
    patterning a plurality of PES burst separators adjacent to the first servo timing mark, wherein the PES burst separators are comprised of areas where no data is written;
    writing magnetically a plurality of servo burst fields between the plurality of PES burst separators, wherein the plurality of servo burst fields are used to determine at least one position error signal; and
    patterning a second servo timing mark adjacent to the plurality of servo burst fields.

12. The method of claim 11, further comprising the step of patterning a first gray code between the first servo timing mark and the plurality of PES burst separators, wherein the first gray code is used to group a plurality of tracks into groups that are a power of two in number, whereby binary addressing can be used to address the plurality of tracks.

13. The method of claim 12, wherein the step of patterning a first gray code between the first servo timing mark and the plurality of servo burst fields comprises the step of patterning a first gray code having diagonally adjacent corners between the first servo timing mark and the plurality of servo burst fields.

14. The method of claim 11, further comprising the step of writing magnetically a second gray code after the second patterned servo timing mark, wherein the second gray code assists in determining where at least one head is positioned over at least one disk.

15. The method of claim 14, wherein the step of writing magnetically a second gray code comprises the step of writing magnetically the second gray code circularly around the rotational center of at least one disk.

16. The method of claim 15, wherein the step of writing magnetically the second gray code comprises the step of writing magnetically the second gray code with a width that varies from sixty-six percent of a track pitch to one hundred percent of a track pitch.

17. The method of claim 11, wherein the step of writing magnetically a plurality of servo burst fields comprises the step of writing magnetically a plurality of servo burst fields in a quad pattern comprising an A burst, a B burst, a C burst and a D burst, and wherein the A burst, B burst, C burst, and D burst are used to determine a first position error signal $PES_{13}N$ and a second position error signal $PES_{13}Q$.

18. The method of claim 17, wherein the step of writing magnetically the plurality of servo burst fields comprises the step of writing magnetically the plurality of servo burst fields using at least one offset head, wherein the at least one offset head is comprised of a writer that is offset to the outer diameter from a reader.

19. A method for fabricating a servo sector for patterned magnetic media comprising the steps of:
  patterning a first servo timing mark on the surface of the media;
  patterning a plurality of PES burst separators adjacent to the first servo timing mark, wherein the PES burst separators are comprised of areas where no data is written;
  writing magnetically a plurality of servo burst fields between the plurality of PES burst separators, wherein the plurality of servo burst fields are used to determine at least one position error signal; and
  patterning a second servo timing mark adjacent to the plurality of servo burst fields.

20. A disk drive storage system comprised of at least one read/write head positioned on the disk drive for reading from and writing to tracks on the disk, comprising:
  at least one disk drive surface in the disk drive storage system, wherein the disk drive surface is divided electronically into data wedges and patterned servo sectors, wherein the patterned servo sectors are comprised of a first patterned servo timing mark and a plurality of patterned PES burst separators;
  means for writing magnetically a plurality of servo burst fields between the plurality of patterned PES burst separators, wherein the plurality of servo burst fields are used to determine at least one position error signal; and
  a second patterned servo timing mark on the at least one disk drive surface, wherein the second patterned servo timing mark is patterned adjacent to the plurality of PES burst separators.

21. The disk drive storage system of claim 20, further comprising a patterned gray code on the at least one disk drive surface, wherein the patterned gray code is patterned between the first patterned servo timing mark and the plurality of PES burst separators.

22. The disk drive storage system of claim 20, further comprising means for writing magnetically written gray code after the second patterned servo timing mark, wherein the magnetically written gray code is used to determine the position of the at least one read/write head over the at least one disk drive surface.

23. The disk drive storage system of claim 22, wherein the means for writing the magnetically written gray code is comprised of means for writing the magnetically written gray code circularly around the rotation center of the at least one disk drive surface.

24. The disk drive storage system of claim 23, wherein the means for writing the magnetically written gray code is comprised of means for writing the magnetically written gray code circularly with a width of sixty-six percent to one hundred percent of a track pitch.

25. The disk drive storage system of claim 22, wherein the means for writing magnetically a plurality of servo burst fields comprises means for writing magnetically a plurality of servo burst fields in a quad pattern comprised of an A burst, a B burst, a C burst and a D burst between the plurality of patterned PES burst separators, wherein the A burst, B burst, C burst, and D burst are used to determine a first position error signal $PES_{13}N$ and a second position error signal $PES_{13}Q$.

26. The disk drive storage system of claim 25, wherein the means for writing magnetically the plurality of servo burst fields comprises means for writing the plurality of patterned PES burst separators using at least one offset head, wherein the at least one offset head is comprised of a writer that is offset to the outer diameter from a reader.

27. A disk drive storage system comprised of at least one read/write head positioned on the disk drive for reading from and writing to tracks on the disk, comprising:
  at least one disk drive surface in the disk drive storage system, wherein the disk drive surface is divided electronically into data wedges and patterned servo sectors, wherein the patterned servo sectors are comprised of a first patterned servo timing mark and a plurality of patterned PES burst separators;
  means for writing magnetically a plurality of servo burst fields between the plurality of patterned PES burst separators, wherein the plurality of servo burst fields are used to determine at least one position error signal;
  a patterned gray code on the at least one disk drive surface, wherein the patterned gray code is patterned between the first patterned servo timing mark and the plurality of PES burst separators; and
  a second patterned servo timing mark on the at least one disk drive surface, wherein the second patterned servo timing mark is patterned adjacent to the plurality of PES burst separators.

* * * * *